United States Patent
Jiang

(10) Patent No.: US 11,881,572 B1
(45) Date of Patent: Jan. 23, 2024

(54) METHOD FOR FAULT DIAGNOSIS AND COMPUTER DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventor: Huaiyu Jiang, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/300,729

(22) Filed: Apr. 14, 2023

(30) Foreign Application Priority Data

Nov. 28, 2022 (CN) .......................... 202211497481.2

(51) Int. Cl.
*H01M 10/633* (2014.01)
*H01M 10/48* (2006.01)
*H01M 10/42* (2006.01)

(52) U.S. Cl.
CPC ....... *H01M 10/633* (2015.04); *H01M 10/482* (2013.01); *H01M 2010/4271* (2013.01); *H01M 2010/4278* (2013.01)

(58) Field of Classification Search
CPC .......................... H01M 10/633; H01M 10/482
See application file for complete search history.

(56) References Cited

U.S. PATENT DOCUMENTS

2021/0234209 A1\* 7/2021 Wang ........................ B60L 3/04

OTHER PUBLICATIONS

CNIPA, Notification to Grant Patent Right for Invention for Chinese Patent Application No. 202211497481.2, dated Jan. 10, 2023, 3 pages.

\* cited by examiner

*Primary Examiner* — Olatunji A Godo
(74) *Attorney, Agent, or Firm* — IP Spring

(57) ABSTRACT

A method for fault diagnosis and a computer device are provided. The method is applied to a battery management system of the energy storage system and includes the following. A first thermal-runaway parameter detected by a first detection apparatus and a second thermal-runaway parameter detected by a second detection apparatus are obtained. A difference between the first thermal-runaway parameter and the second thermal-runaway parameter is calculated. Determine that at least one of the first detection apparatus or the second detection apparatus fails, when the difference is greater than a difference threshold. Determine that a battery module fails, when the first thermal-runaway parameter is greater than a first threshold, the second thermal-runaway parameter is greater than a second threshold, and the difference is less than or equal to the difference threshold.

18 Claims, 6 Drawing Sheets

METHOD FOR FAULT DIAGNOSIS AND COMPUTER DEVICE

CROSS-REFERENCE TO RELATED APPLICATION (S)

This application claims priority under 35 U.S.C. § 119(a) to and the benefit of Chinese Patent Application No. 202211497481.2, filed Nov. 28, 2022, the disclosure of which is hereby incorporated by reference in its entirety.

TECHNICAL FIELD

This disclosure relates to the field of new energy technology, and in particular, to a method for fault diagnosis and a computer device.

BACKGROUND

With wide application of energy storage, fire and explosion accidents occur in energy storage systems more frequently, and thus energy storage security gains wide attention. An important part of a lithium battery based energy storage system is a lithium battery. Once the lithium battery enters a thermal runaway state, an internal temperature of the lithium battery is continuously increased, resulting in thermal decomposition of electrolyte and electrode materials, and thus combustible and harmful gases are generated, which further accelerates various physical and chemical reactions inside the battery, and finally leads to a fire or explosion accident. Therefore, a detector is generally configured in the energy storage system to monitor an operating state of the lithium battery, and thus an abnormal situation can be discovered early according to data collected by the detector, to improve the security of the energy storage system.

However, when the detector is adopted to monitor the operating state of the battery, if a fault of the detector is not discovered in time, subsequent monitoring may be affected seriously, and thus a false alarm is generated, to make it hard for people to determine whether the fault occurs in the battery or the detector, which brings difficulties to maintenance of a repairman. In addition, since the energy storage system includes multiple battery modules and detectors, when the fault occurs, the repairman only knows that there is an abnormal situation according to an alarm signal received, but does not know a reason and a specific location of the fault, which brings difficulties to maintenance of the repairman.

SUMMARY

In a first aspect, a method for fault diagnosis is provided in embodiments of the disclosure. The method is applied to a battery management system of an energy storage system. The energy storage system includes the battery management system, a temperature control apparatus, and multiple energy storage units. Each of the multiple energy storage units includes a battery module, a first detection apparatus, and a second detection apparatus. The first detection apparatus is configured to detect a first thermal-runaway parameter inside the battery module, and the second detection apparatus is configured to detect a second thermal-runaway parameter outside the battery module. The first detection apparatus and the second detection apparatus of each of the multiple energy storage units are in communication connection with the battery management system. The method includes the following. The first thermal-runaway parameter detected by the first detection apparatus of each of the multiple energy storage units and the second thermal-runaway parameter detected by the second detection apparatus of each of the multiple energy storage units are obtained. A difference between the first thermal-runaway parameter and the second thermal-runaway parameter is calculated. The difference is compared with a difference threshold. Determine that at least one of the first detection apparatus or the second detection apparatus fails, when the difference is greater than the difference threshold. Determine that the battery module fails, when the first thermal-runaway parameter is greater than a first threshold, the second thermal-runaway parameter is greater than a second threshold, and the difference is less than or equal to the difference threshold. Location information of the first detection apparatus and location information of the second detection apparatus is obtained when the at least one of the first detection apparatus or the second detection apparatus fails, and a detection-apparatus fault signal is sent to the temperature control apparatus, where the detection-apparatus fault signal includes the location information of the first detection apparatus and the location information of the second detection apparatus. Location information of the failed battery module is obtained when the battery module fails, and a battery-module fault signal is sent to the temperature control apparatus, where the battery-module fault signal includes the location information of the failed battery module.

In a second aspect, a computer device is provided in embodiments of the disclosure. The computer device includes a processor and a memory. The memory is coupled with the processor and configured to store computer programs. The computer programs are configured to be performed by the processor and include instructions configured to perform the method of the first aspect.

BRIEF DESCRIPTION OF THE DRAWINGS

To describe technical solutions in embodiments of the disclosure or the related art more clearly, the following will give a brief introduction to accompanying drawings required for describing embodiments or the related art. Apparently, the accompanying drawings described hereinafter are merely some embodiments of the disclosure. Based on these drawings, those of ordinary skill in the art can also obtain other drawings without creative effort.

DETAILED DESCRIPTION

Figure 1:
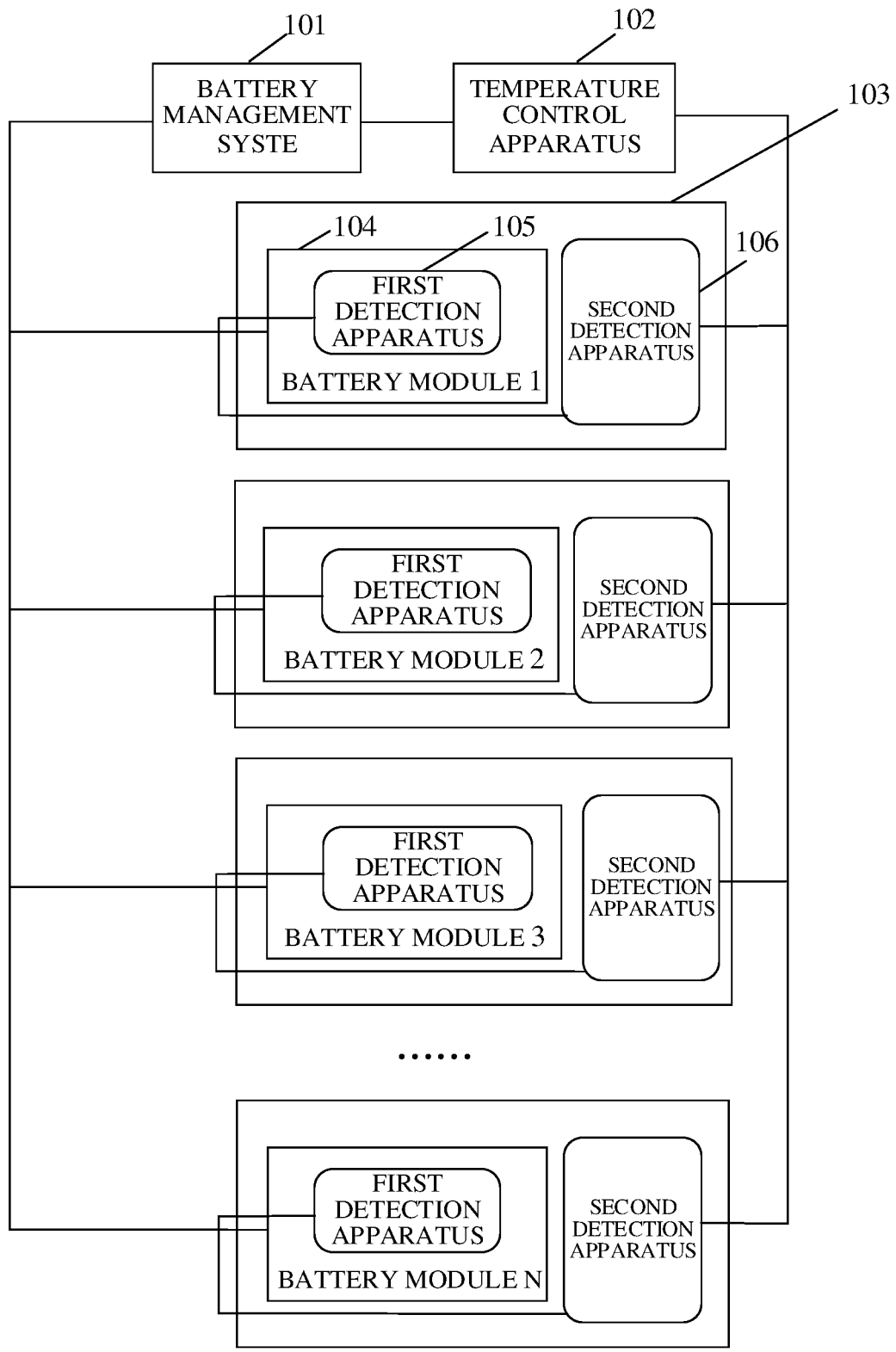
FIG. 1 is a schematic structural diagram of an energy storage system provided in embodiments of the disclosure.

Technical solutions in embodiments of the disclosure are clearly and completely described in the following with reference to accompanying drawings in embodiments of the disclosure. Apparently, the described embodiments are part rather than all of embodiments of the disclosure. All other embodiments obtained by those of ordinary skill in the art based on embodiments of the disclosure without creative effort are within the protection scope of the disclosure.

Terms "first", "second", "third", "fourth", and the like used in the specification and the accompany drawings of the disclosure are used to distinguish different objects rather than describe a particular order. In addition, terms "comprise" and "have" as well as variations thereof are intended to cover non-exclusive inclusion. For example, a process, a method, a system, a product, or a device that include a series of operations or units include, but are not limited to, the listed operations or units, optionally also include operations or units that are not listed, or optionally also include other operations or units that are inherent to the process, the method, the system, the product, or the device.

The reference herein to "embodiment" means that specific features, structures, or characteristics described in conjunction with embodiments may be included in at least one embodiment of the disclosure. The phrase appearing in various positions in the specification does not necessarily refer to the same embodiment, nor is it an independent or alternative embodiment mutually exclusive with other embodiments. Those of ordinary skill in the art explicitly and implicitly understand that embodiments described herein can be combined with other embodiments.

It can be further understood that, term "and/or" in the disclosure is simply an illustration of an association relationship of associated objects, indicating that three relationships can exist, for example, A and/or B can indicate existence of A alone, A and B together, and B alone. In addition, character "/" in the disclosure generally indicates that associated objects are in an "or" relationship.

At present, to discover an abnormal situation of a battery in time, a detector is generally adopted to monitor an operating state of the battery. However, when an alarm signal is received, it is hard to determine whether the alarm is a false alarm caused by a fault of the detector or an alarm caused by a fault of the battery, and a specific location of the fault is also not known, which brings difficulties to maintenance of a repairman.

In view of the above problems, a method for fault diagnosis, an energy storage system, and a computer device are provided in the disclosure. The method is applied to a battery management system of the energy storage system. According to the method, a failed object can be determined, and a location of a fault point can be informed, to facilitate maintenance of the repairman and improve work efficiency. To facilitate understanding of the method for fault diagnosis, the energy storage system, and the computer device provided in embodiments of the disclosure, the energy storage system involved in embodiments of the disclosure is introduced below.

A method for fault diagnosis, an energy storage system, and a computer device are provided in embodiments of the disclosure, such that a failed object can be determined, and a location of a fault point can be informed, to facilitate maintenance of repairmen and improve work efficiency.

A method for fault diagnosis is provided in embodiments of the disclosure. The method is applied to a battery management system of an energy storage system. The energy storage system includes the battery management system, a temperature control apparatus, and multiple energy storage units. Each of the multiple energy storage units includes a battery module, a first detection apparatus, and a second detection apparatus. The first detection apparatus is configured to detect a first thermal-runaway parameter inside the battery module, and the second detection apparatus is configured to detect a second thermal-runaway parameter outside the battery module. The first detection apparatus and the second detection apparatus of each of the multiple energy storage units are in communication connection with the battery management system. The method includes the following. The first thermal-runaway parameter detected by the first detection apparatus of each of the multiple energy storage units and the second thermal-runaway parameter detected by the second detection apparatus of each of the multiple energy storage units are obtained. A difference between the first thermal-runaway parameter and the second thermal-runaway parameter is calculated. The difference is compared with a difference threshold. Determine that at least one of the first detection apparatus or the second detection apparatus fails, when the difference is greater than the difference threshold. Determine that the battery module fails, when the first thermal-runaway parameter is greater than a first threshold, the second thermal-runaway parameter is greater than a second threshold, and the difference is less than or equal to the difference threshold. Location information of the first detection apparatus and location information of the second detection apparatus is obtained when the at least one of the first detection apparatus or the second detection apparatus fails, and a detection-apparatus fault signal is sent to the temperature control apparatus, where the detection-apparatus fault signal includes the location information of the first detection apparatus and the location information of the second detection apparatus. Location information of the failed battery module is obtained when the battery module fails, and a battery-module fault signal is sent to the temperature control apparatus, where the battery-module fault signal includes the location information of the failed battery module.

In a possible implementation, each of the multiple energy storage units further includes a third detection apparatus and a fourth detection apparatus. The third detection apparatus is a backup detection apparatus of the first detection apparatus and configured to detect a third thermal-runaway parameter inside the battery module, and the fourth detection apparatus is a backup detection apparatus of the second detection apparatus and configured to detect a fourth thermal-runaway parameter outside the battery module. After sending the detection-apparatus fault signal to the temperature control apparatus, the method further includes the following operations. A detection request sent, within a first preset time, by the temperature control apparatus is received. The third thermal-runaway parameter inside the battery module and the fourth thermal-runaway parameter outside the battery module are obtained in response to the detection request. Determine that the first detection apparatus fails, when an error between the first thermal-runaway parameter and the third thermal-runaway parameter is greater than a first preset difference, and an error between the second thermal-runaway parameter and the fourth thermal-runaway parameter is less than or equal to a second preset difference. Determine that the second detection apparatus fails, when the error between the first thermal-runaway parameter and the third thermal-runaway parameter is less than or equal to the first preset difference, and the error between the second thermal-runaway parameter and the fourth thermal-runaway parameter is greater than the second preset difference.

In a possible implementation, the method further includes the following. A first fault-type evaluation parameter within a second preset time is obtained based on a determination that the first detection apparatus fails, and a fault type of the first detection apparatus is determined according to the first fault-type evaluation parameter. A second fault-type evaluation parameter within the second preset time is obtained based on a determination that the second detection apparatus fails, and a fault type of the second detection apparatus is determined according to the second fault-type evaluation parameter. The fault type includes a failure and a deviation, where the failure indicates that a detected value of a detector is always a fixed value, and the deviation indicates that the detected value is different from an actual value.

In a possible implementation, the method further includes the following. Determine that the battery module fails, when the second thermal-runaway parameter and the fourth thermal-runaway parameter each are greater than the second threshold, based on a determination that the first detection apparatus fails. Determine that the battery module fails, when the first thermal-runaway parameter and the third thermal-runaway parameter each are greater than the first threshold, based on a determination that the second detection apparatus fails.

In a possible implementation, before comparing the difference with the difference threshold, the method further includes: obtaining a difference-threshold evaluation parameter, where the difference-threshold evaluation parameter includes a battery cell type, a thermal-runaway parameter type, historical data of the first thermal-runaway parameter stored on the battery management system, and historical data of the second thermal-runaway parameter stored on the battery management system; and determining the difference threshold according to the difference-threshold evaluation parameter.

In a possible implementation, the method further includes the following. Determine that both the first detection apparatus and the second detection apparatus of a first battery module in multiple battery modules fail, when an error between the first thermal-runaway parameter and the third thermal-runaway parameter of the first battery module is greater than the first preset difference, and an error between the second thermal-runaway parameter and the fourth thermal-runaway parameter of the first battery module is greater than the second preset difference. Determine that both the first detection apparatus and the second detection apparatus of a second battery module adjacent to the first battery module in the multiple battery modules do not fail, when an error between the first thermal-runaway parameter and the third thermal-runaway parameter of the second battery module is less than or equal to the first preset difference, and an error between the second thermal-runaway parameter and the fourth thermal-runaway parameter of the second battery module is less than or equal to the second preset difference. Determine that the first battery module fails, when the first thermal-runaway parameter detected by the first detection apparatus of the second battery module is less than or equal to the first threshold, and the second thermal-runaway parameter detected by the second detection apparatus of the second battery module is greater than a third threshold, when both the first detection apparatus and the second detection apparatus of the first battery module fail, and both the first detection apparatus and the second detection apparatus of the second battery module do not fail.

In a possible implementation, the third threshold is less than the second threshold.

In a possible implementation, the first detection apparatus includes a first temperature-detector configured to detect an internal temperature of the battery module, a first combustible-gas-detector configured to detect an internal combustible-gas concentration of the battery module, and a first smoke-detector configured to detect an internal smoke concentration of the battery module. The second detection apparatus includes a second temperature-detector configured to detect an external temperature of the battery module, a second combustible-gas-detector configured to detect an external combustible-gas concentration of the battery module, and a second smoke-detector configured to detect an external smoke concentration of the battery module. The first thermal-runaway parameter includes a first temperature detected by the first temperature-detector, a first combustible-gas-concentration detected by the first combustible-gas-detector, and a first smoke-concentration detected by the first smoke-detector. Additionally, the second thermal-runaway parameter includes a second temperature detected by the second temperature-detector, a second combustible-gas-concentration detected by the second combustible-gas-detector, and a second smoke-concentration detected by the second smoke-detector.

In a possible implementation, calculating the difference between the first thermal-runaway parameter and the second thermal-runaway parameter includes: calculating a temperature difference between the first temperature and the second temperature, calculating a gas concentration difference between the first combustible-gas-concentration and the second combustible-gas-concentration, and calculating a smoke concentration difference between the first smoke-concentration and the second smoke-concentration.

In a possible implementation, determining that the at least one of the first detection apparatus or the second detection apparatus fails, when the difference is greater than the difference threshold includes the following. Determine that at least one of the first temperature-detector or the second temperature-detector fails, when the temperature difference is greater than a temperature difference threshold. Determine that at least one of the first combustible-gas-detector or the second combustible-gas-detector fails, when the gas concentration difference is greater than a gas-concentration difference threshold. Determine that at least one of the first smoke-detector or the second smoke-detector fails, when the smoke concentration difference is greater than a smoke-concentration difference threshold.

In a possible implementation, determining that the battery module fails, when the first thermal-runaway parameter is greater than the first threshold, the second thermal-runaway parameter is greater than the second threshold, and the difference is less than or equal to the difference threshold includes the following. Determine that the battery module fails, when the first temperature is greater than a first temperature-threshold, the second temperature is greater than a second temperature-threshold, and the temperature difference is less than or equal to a temperature difference threshold. Alternatively, determine that the battery module fails, when the first combustible-gas-concentration is greater than a first gas-concentration-threshold, the second combustible-gas-concentration is greater than a second gas-concentration-threshold, and the gas concentration difference is less than or equal to a gas-concentration difference threshold. Alternatively, determine that the battery module fails, when the first smoke-concentration is greater than a first smoke-concentration-threshold, the second smoke-concentration is greater than a second smoke-concentration-threshold, and the smoke concentration difference is less than or equal to a smoke-concentration difference threshold.

In a possible implementation, the third detection apparatus includes a third temperature-detector configured to detect an internal temperature of the battery module, a third combustible-gas-detector configured to detect an internal combustible-gas concentration of the battery module, and a third smoke-detector configured to detect an internal smoke concentration of the battery module. The fourth detection apparatus includes a fourth temperature-detector configured to detect an external temperature of the battery module, a fourth combustible-gas-detector configured to detect an external combustible-gas concentration of the battery module, and a fourth smoke-detector configured to detect an external smoke concentration of the battery module. The third thermal-runaway parameter includes a third temperature detected by the third temperature-detector, a third combustible-gas-concentration detected by the third combustible-gas-detector, and a third smoke-concentration detected by the third smoke-detector. The fourth thermal-runaway parameter includes a fourth temperature detected by the fourth temperature-detector, a fourth combustible-gas-concentration detected by the fourth combustible-gas-detector, and a fourth smoke-concentration detected by the fourth smoke-detector.

An energy storage system is further provided in embodiments of the disclosure. The energy storage system includes a battery management system, a temperature control apparatus, and multiple energy storage units. Each of the multiple energy storage units includes a battery module, a first detection apparatus, and a second detection apparatus. The first detection apparatus is configured to detect a first thermal-runaway parameter inside the battery module, and the second detection apparatus is configured to detect a second thermal-runaway parameter outside the battery module. The first detection apparatus and the second detection apparatus of each of the multiple energy storage units are in communication connection with the battery management system. The battery management system includes an obtaining unit, a calculating unit, a comparing unit, a determining unit, and a sending unit. The obtaining unit is configured to obtain the first thermal-runaway parameter detected by the first detection apparatus of each of the multiple energy storage units and the second thermal-runaway parameter detected by the second detection apparatus of each of the multiple energy storage units. The calculating unit is configured to calculate a difference between the first thermal-runaway parameter and the second thermal-runaway parameter. The comparing unit is configured to compare the difference with a difference threshold. The determining unit is configured to determine that at least one of the first detection apparatus or the second detection apparatus fails, when the difference is greater than the difference threshold; and further configured to determine that the battery module fails, when the first thermal-runaway parameter is greater than a first threshold, the second thermal-runaway parameter is greater than a second threshold, and the difference is less than or equal to the difference threshold. The sending unit is configured to obtain location information of the first detection apparatus and location information of the second detection apparatus when the at least one of the first detection apparatus or the second detection apparatus fails, and send a detection-apparatus fault signal to the temperature control apparatus, where the detection-apparatus fault signal includes the location information of the first detection apparatus and the location information of the second detection apparatus; and further configured to obtain location information of the failed battery module when the battery module fails, and send a battery-module fault signal to the temperature control apparatus, where the battery-module fault signal includes the location information of the failed battery module.

A computer device is further provided in embodiments of the disclosure. The computer device includes a processor and a memory. The memory is coupled with the processor and configured to store computer programs. The computer programs are configured to be performed by the processor and include instructions configured to perform the method of the above.

The following advantageous effects can be achieved by implementing embodiments of the disclosure. In embodiments of the disclosure, the battery management system obtains the first thermal-runaway parameter detected by the first detection apparatus of each of the multiple energy storage units and the second thermal-runaway parameter detected by the second detection apparatus of each of the multiple energy storage units, calculates the difference between the first thermal-runaway parameter and the second thermal-runaway parameter, and compares the difference with the difference threshold. The battery management system determines that the at least one of the first detection apparatus or the second detection apparatus fails, when the difference is greater than the difference threshold; and further determines that the battery module fails, when the first thermal-runaway parameter is greater than the first threshold, the second thermal-runaway parameter is greater than the second threshold, and the difference is less than or equal to the difference threshold. The battery management system obtains the location information of the first detection apparatus and the location information of the second detection apparatus when the at least one of the first detection apparatus or the second detection apparatus fails, and sends the detection-apparatus fault signal to the temperature control apparatus, where the detection-apparatus fault signal includes the location information of the first detection apparatus and the location information of the second detection apparatus; and further obtains the location information of the failed battery module when the battery module fails, and sends the battery-module fault signal to the temperature control apparatus, where the battery-module fault signal includes the location information of the failed battery module. In this way, on the one hand, whether the detection apparatus or the battery module fails can be determined, and on the other hand, a specific location of the fault can be determined, to facilitate maintenance of a repairman.

Referring to FIG. 1, FIG. 1 is a schematic structural diagram of an energy storage system provided in embodiments of the disclosure. The energy storage system includes a battery management system 101, a temperature control apparatus 102, and multiple energy storage units 103. Each of the multiple energy storage units 103 includes a battery module 104, a first detection apparatus 105, and a second detection apparatus 106. Each battery module 104 corresponds to one first detection apparatus 105 and one second detection apparatus 106. The first detection apparatus 105 is disposed inside the battery module 104, and the second detection apparatus 106 is disposed outside the battery module 104. Both the first detection apparatus 105 and the second detection apparatus 106 of each of the multiple energy storage units 103 are in communication connection with the battery management system 101. The other end of the second detection apparatus 106 is coupled with the temperature control apparatus 102. One end of the battery management system 101 is coupled with multiple battery modules 104, and the other end of the battery management system 101 is coupled with the temperature control apparatus 102. In the preferred embodiment, the connection between the first detection apparatus 105 and the battery management system 101 or between the second detection apparatus 106 and the battery management system 101, or the connection between the second detection apparatus 106 and the temperature control apparatus 102, or the connection between the battery management system 101 and the battery module 104, or the connection between the battery management system 101 and the temperature control apparatus 102 is communication connection, where the communication connection includes a wired connection or a wireless connection. Specifically, in the preferred embodiment, the communication connection may be daisy chain communication connection or controller area network (CAN) connection. Both the first detection apparatus 105 and the second detection apparatus 106 are configured to monitor a state of a corresponding battery module 104. The first detection apparatus 105 is configured to detect a first thermal-runaway parameter inside the battery module 104, and the second detection apparatus 106 is configured to detect a second thermal-runaway parameter outside the battery module 104. The first detection apparatus 105 and the second detection apparatus 106 are configured to transmit detected data to the battery management system 101, the battery management system 101 is configured to perform a fault determination according to the detected data and send a fault determination result to the temperature control apparatus 102. In the preferred embodiment, the battery management system 101 adopts a three-level management and control mode of an overall control unit, a master control unit, and a slave control unit. The slave control unit is configured to perform directly communication connection with the battery module 104, that is, the first detection apparatus 105 and the second detection apparatus 106 are in communication connection with the slave control unit. A fault signal of the first detection apparatus 105 and/or the second detection apparatus 106 is detected, and then is collected and transmitted by the slave control unit to the master control unit. Next, the fault signal is collected and transmitted by the master control unit to the overall control unit. Finally, the fault signal is collected and transmitted by the overall control unit to the temperature control apparatus 102. The temperature control apparatus 102 is configured to receive the fault signal and display a failed object and a location of a fault point, which is convenient for a repairman to process the fault. In embodiments of the disclosure, if the battery module 104 fails, the temperature control apparatus 102 is further configured to cool the battery module 104, to avoid occurrence of thermal runaway. The temperature control apparatus 102 includes an air-cooling apparatus, a liquid-cooling apparatus, and a thermal-runaway prevention apparatus.

In a conventional energy-storage system, only one detection apparatus is adopted to monitor a state of a battery module. When the detection apparatus or the battery module fails, an alarm is generated. Accordingly, it is hard for a repairman to determine whether the battery module really fails or a false alarm is caused by a fault of a detector, which brings difficulties to maintenance. In addition, it is hard to accurately monitor the state of the battery module due to the fault of the detection apparatus. Therefore, two detection apparatuses are adopted in the energy storage system provided in embodiments of the disclosure, that is, the first detection apparatus 105 and the second detection apparatus 106 are configured to simultaneously monitor the state of one battery module 104. As such, not only can more accurate monitoring be achieved, but also a failed object and a fault location can be located accurately by analyzing data of the two detection apparatuses by the battery management system 101.

Figure 2:
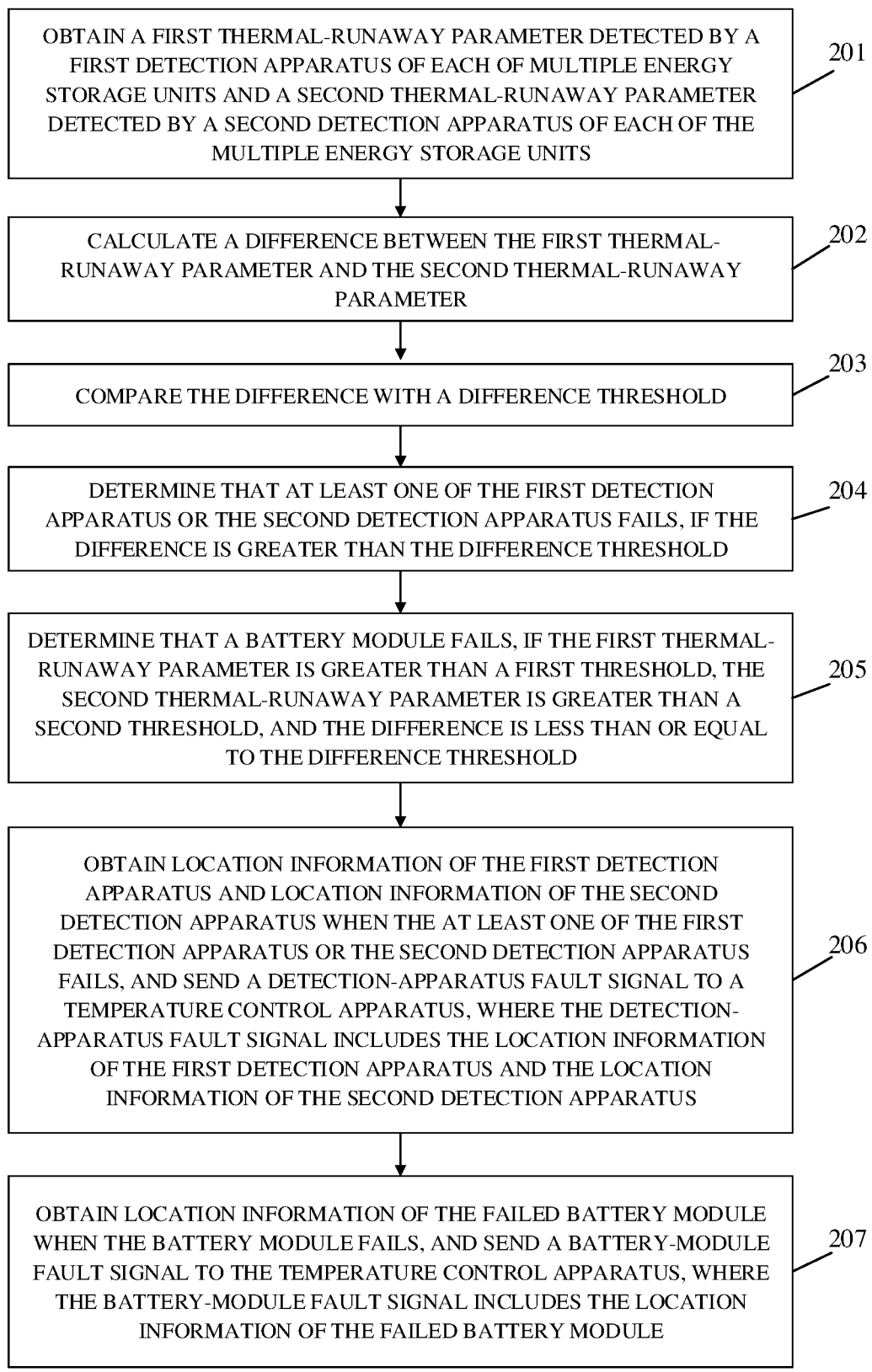
FIG. 2 is a schematic flowchart of a method for fault diagnosis provided in embodiments of the disclosure.

Referring to FIG. 2, FIG. 2 is a schematic flowchart of a method for fault diagnosis provided in embodiments of the disclosure. As illustrated in FIG. 2, the method includes operations 201 to 207.

201, obtain a first thermal-runaway parameter detected by a first detection apparatus of each of multiple energy storage units and a second thermal-runaway parameter detected by a second detection apparatus of each of the multiple energy storage units.

Figure 1A:
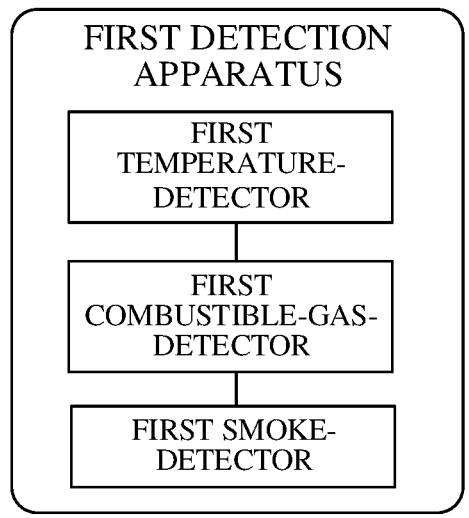
FIG. 1A is a schematic structural diagram of a first detection apparatus provided in embodiments of the disclosure.
Figure 1B:
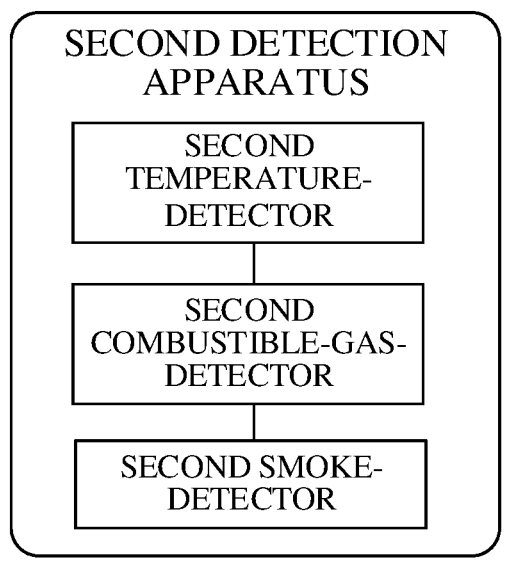
FIG. 1B is a schematic structural diagram of a second detection apparatus provided in embodiments of the disclosure.

Referring to FIG. 1A, FIG. 1A is a schematic structural diagram of the first detection apparatus provided in embodiments of the disclosure. In a possible implementation, the first detection apparatus includes a first temperature-detector configured to detect an internal temperature of the battery module, a first combustible-gas-detector configured to detect an internal combustible-gas concentration of the battery module, and a first smoke-detector configured to detect an internal smoke concentration of the battery module. Referring to FIG. 1B, FIG. 1B is a schematic structural diagram of the second detection apparatus provided in embodiments of the disclosure. The second detection apparatus includes a second temperature-detector configured to detect an external temperature of the battery module, a second combustible-gas-detector configured to detect an external combustible-gas concentration of the battery module, and a second smoke-detector configured to detect an external smoke concentration of the battery module. The first thermal-runaway parameter includes a first temperature detected by the first temperature-detector, a first combustible-gas-concentration detected by the first combustible-gas-detector, and a first smoke-concentration detected by the first smoke-detector. The second thermal-runaway parameter includes a second temperature detected by the second temperature-detector, a second combustible-gas-concentration detected by the second combustible-gas-detector, and a second smoke-concentration detected by the second smoke-detector.

Specifically, thermal runaway of the battery module may cause a change in temperature, combustible gas concentration, and smoke concentration, and thus a change of the battery module from a normal operating state to a fault state may be represented by feature parameters such as the temperature, the combustible gas concentration, and the smoke concentration. In embodiments of the disclosure, the first temperature-detector, the first combustible-gas-detector, the first smoke-detector, the second temperature-detector, the second combustible-gas-detector, and the second smoke-detector are adopted to monitor the feature parameters described above, so that whether the battery module has a risk of thermal runaway can be determined in time. Additionally, by adopting the first detection apparatus and the second detection apparatus two detection apparatuses to simultaneously monitor one battery module and comparing thermal runaway parameters detected by the two detection apparatuses, on the one hand, the accuracy of battery fault diagnosis can be improved, and on the other hand, whether a battery module or a detection apparatus fails can be determined by comparison.

When the thermal runaway occurs in the battery module, combustible gases such as $CO$, $H_2$, and $CH_4$ may be released. Therefore, the first combustible-gas-detector and the second combustible-gas-detector each can be a CO detector for monitoring a concentration of CO, or a $H_2$ detector for monitoring a concentration of $H_2$, or a $CH_4$ detector for monitoring a concentration of $CH_4$, which is not limited in embodiments of the disclosure.

The battery management system is in communication connection with the first temperature-detector, the first combustible-gas-detector, the first smoke-detector, the second temperature-detector, the second combustible-gas-detector, and the second smoke-detector. The first temperature-detector is configured to send the first temperature detected to the battery management system. The first combustible-gas-detector is configured to send the first combustible-gas-concentration detected to the battery management system. The first smoke-detector is configured to send the first smoke-concentration detected to the battery management system. The second temperature-detector is configured to send the second temperature detected to the battery management system. The second combustible-gas-detector is configured to send the second combustible-gas-concentration detected to the battery management system. The second smoke-detector is configured to send the second smoke-concentration detected to the battery management system. The battery management system is configured to determine whether or not a fault occurs based on the first temperature, the first combustible-gas-concentration, the first smoke-concentration, the second temperature, the second combustible-gas-concentration, and the second smoke-concentration.

202, calculate a difference between the first thermal-runaway parameter and the second thermal-runaway parameter.

After obtaining the first thermal-runaway parameter and the second-thermal runaway parameter, the battery management system is configured to calculate the difference between the first thermal-runaway parameter and the second thermal-runaway parameter, and then perform fault determination based on the difference.

In a possible implementation, 202 may include the following. A temperature difference between the first temperature and the second temperature is calculated. A gas concentration difference between the first combustible-gas-concentration and the second combustible-gas-concentration is calculated. Additionally, a smoke concentration difference between the first smoke-concentration and the second smoke-concentration is calculated.

203, compare the difference with a difference threshold.

204, determine that at least one of the first detection apparatus or the second detection apparatus fails, if the difference is greater than the difference threshold.

In a possible implementation, 204 may include the following. Determine that at least one of the first temperature-detector or the second temperature-detector fails is determined, if the temperature difference is greater than a temperature difference threshold. Determine that at least one of the first combustible-gas-detector or the second combustible-gas-detector fails, if the gas concentration difference is greater than a gas-concentration difference threshold. Determine that at least one of the first smoke-detector or the second smoke-detector fails, if the smoke concentration difference is greater than a smoke-concentration difference threshold.

Specifically, since both the first temperature-detector and the second temperature-detector monitor the same battery module, the temperature difference between the first temperature and the second temperature should be within a certain error range when both the first temperature-detector and the second temperature-detector normally operate with no fault, and the temperature difference threshold corresponds to a critical indicator indicating whether a temperature detector fails. When the temperature difference is greater than the temperature difference threshold, it is indicated that at least one temperature detector in the first detection apparatus and the second detection apparatus corresponding to the battery module fails. Likewise, since both the first combustible-gas-detector and the second combustible-gas-detector monitor the same battery module, the gas concentration difference between the first combustible-gas-concentration and the second combustible-gas-concentration should be within a certain error range when both the first combustible-gas-detector and the second combustible-gas-detector normally operate with no fault, and the gas-concentration difference threshold corresponds to a critical indicator indicating whether a combustible-gas-detector fails. When the gas concentration difference is greater than the gas-concentration difference threshold, it is indicated that at least one combustible-gas-detector in the first detection apparatus and the second detection apparatus corresponding to the battery module fails. Likewise, since both the first smoke-detector and the second smoke-detector monitor the same battery module, the smoke concentration difference between the first smoke-concentration and the second smoke-concentration should be within a certain error range when both the first smoke-detector and the second smoke-detector normally operate with no fault, and the smoke-concentration difference threshold is a critical indicator indicating whether a smoke detector fails. When the smoke concentration difference is greater than the smoke-concentration difference threshold, it is indicated that at least one smoke detector in the first detection apparatus and the second detection apparatus corresponding to the battery module fails.

It can be seen that, in embodiments of the disclosure, by calculating the temperature difference, the gas concentration difference, and the smoke concentration difference between the first detection apparatus and the second detection apparatus, and comparing the temperature difference with the temperature difference threshold, the gas concentration difference with the gas-concentration difference threshold, and the smoke concentration difference with the smoke-concentration difference threshold, whether a detection apparatus fails can be determined. Additionally, which one or more of a temperature detector, a combustible gas detector, or a smoke detector in the detection apparatus fail can be further determined by setting the temperature difference threshold, the gas-concentration difference threshold, and the smoke-concentration difference threshold, to facilitate maintenance for a repairman.

In a possible implementation, before comparing the difference with the difference threshold, the method further includes the following. A difference-threshold evaluation parameter is obtained, where the difference-threshold evaluation parameter includes a battery cell type, a thermal-runaway parameter type, historical data of the first thermal-runaway parameter stored on the battery management system, and historical data of the second thermal-runaway parameter stored on the battery management system. Additionally, the difference threshold according to the difference-threshold evaluation parameter is determined.

Specifically, the first thermal-runaway parameter detected by the first detection apparatus and the second thermal-runaway parameter detected by the second detection apparatus are related to a battery cell object monitored. The battery cells constituting the battery module has various types, such as lithium ferrophosphate batteries, ternary lithium batteries, and lithium-titanate batteries. Batteries of different types have different phenomena when thermal runaway occurs, and thus thermal runaway parameters are also different, and accordingly, batteries of different types also have different difference thresholds. Secondly, since the temperature, the combustible gas concentration, and the smoke concentration are thermal runaway parameters of different types, difference thresholds thereof cannot be set to be the same, and the temperature difference threshold, the gas-concentration difference threshold, and the smoke-concentration difference threshold need to be set respectively for the temperature, the combustible gas concentration, and the smoke concentration. In addition, the battery module also has different thermal-runaway parameters in different stages, and thus different difference thresholds need to be set for different stages. Therefore, after evaluation parameters affecting the difference thresholds are obtained, a fault sample set including the difference threshold evaluation parameters can be acquired from a fault library, and the fault sample set is trained by means of machine learning to obtain a threshold model trained. The fault sample set includes data reported when the detection apparatus fails previously. A difference threshold that indicates whether the detection apparatus fails can be determined according to the threshold model. For example, input of the threshold model is (ternary lithium battery), (temperature), $(X_1, X_2, \ldots, X_N)$, $(Y_1, Y_2, \ldots, Y_N)$, where $X_N$ represents a temperature collected at a current moment by the first temperature-detector in the first detection apparatus, and $Y_N$ represents a temperature collected at the current moment by the second temperature-detector in the second detection apparatus. A temperature difference threshold at the current moment when the detection apparatus fails can be obtained by means of the threshold model. When a difference between $X_N$ and $Y_N$ is greater than the temperature difference threshold, it is indicated that at least one temperature detector in the first detection apparatus and the second detection apparatus fails.

It can be seen that, in embodiments of the disclosure, the difference threshold can be dynamically adjusted by using the difference-threshold evaluation parameters and the threshold model, and different difference thresholds can be determined for batteries of different types and thermal runaway parameters of different types, to monitor more accurately whether the detection apparatus fails.

205, determine that a battery module fails, if the first thermal-runaway parameter is greater than a first threshold, the second thermal-runaway parameter is greater than a second threshold, and the difference is less than or equal to the difference threshold.

In a possible implementation, 205 includes the following. Determine that the battery module fails, if the first temperature is greater than a first temperature-threshold, the second temperature is greater than a second temperature-threshold, and the temperature difference is less than or equal to a temperature difference threshold. Alternatively, determine that the battery module fails, if the first combustible-gas-concentration is greater than a first gas-concentration-threshold, the second combustible-gas-concentration is greater than a second gas-concentration-threshold, and the gas concentration difference is less than or equal to a gas-concentration difference threshold. Alternatively, determine that the battery module fails, if the first smoke-concentration is greater than a first smoke-concentration-threshold, the second smoke-concentration is greater than a second smoke-concentration-threshold, and the smoke concentration difference is less than or equal to a smoke-concentration difference threshold.

The first temperature-threshold, the second temperature-threshold, the first gas-concentration-threshold, the second gas-concentration-threshold, the first smoke-concentration-threshold, and the second smoke-concentration-threshold are parameter thresholds set for monitoring whether the battery module fails.

It can be seen that, in embodiments of the disclosure, the operating state of the battery module can be monitored based on multiple parameters, i.e., temperature, gas concentration, and smoke concentration, such that whether the battery fails can be discovered in time, and thus a repairman can be informed of maintenance or corresponding fault processing. In addition, whether the battery fails is determined based on two temperature thresholds, two gas concentration thresholds, and two smoke concentration thresholds set for two detection apparatuses. Compared with adopting only one detection apparatus, a possibility of false alarm is reduced, and whether the battery fails can be determined more accurately, to facilitate maintenance of the repairman.

206, obtain location information of the first detection apparatus and location information of the second detection apparatus when the at least one of the first detection apparatus or the second detection apparatus fails, and send a detection-apparatus fault signal to temperature control apparatus, where the detection-apparatus fault signal includes the location information of the first detection apparatus and the location information of the second detection apparatus.

Specifically, the location information of the first detection apparatus and the location information of the second detection apparatus may be codes assigned to the first detection apparatus and the second detection apparatus by the battery management system. According to the codes, one or more failed detection apparatuses can be informed to the repairman. For example, a code of the first detection apparatus corresponding to battery module 1 is 00101, a code of the second detection apparatus corresponding to battery module 1 is 00102, a code of the first detection apparatus corresponding to battery module 2 is 01001, a code of the second detection apparatus corresponding to battery module 2 is 01002, a code of the first detection apparatus corresponding to battery module 3 is 01101, and a code of the second detection apparatus corresponding to battery module 3 is 01102. When determining that at least one detection apparatus corresponding to battery module 3 fails, the battery management system sends 01101 and 01102 to the temperature control apparatus. Then, 01101 and 01102 are displayed on a display screen of the temperature control apparatus. The repairman determines that at least one of the first detection apparatus or the second detection apparatus corresponding to battery module 3 fails once seeing 01101 and 01102. As such, there is no need for the repairman to check detection apparatuses one by one, so as to help the repairman find the fault point quickly. Alternatively, the battery management system sends a detection-apparatus fault signal to the temperature control apparatus, and the temperature control apparatus displays corresponding content on the display screen according to the detection-apparatus fault signal. For example, the display screen may display "temperature, 01101, 01102", and accordingly, the repairman can know that at least one temperature detector in the first detection apparatus and the second detection apparatus corresponding to battery module 3 fails.

It can be seen that, in embodiments of the disclosure, when at least one of the first detection apparatus or the second detection apparatus fails, the battery management system obtains the location information of the first detection apparatus and the location information of the second detection apparatus, and sends the detection-apparatus fault signal to the temperature control apparatus, where the detection-apparatus fault signal includes the location information of the first detection apparatus and the location information of the second detection apparatus. In this way, the repairman can quickly discover the failed detection apparatus, thereby improving maintenance efficiency.

Figure 1C:
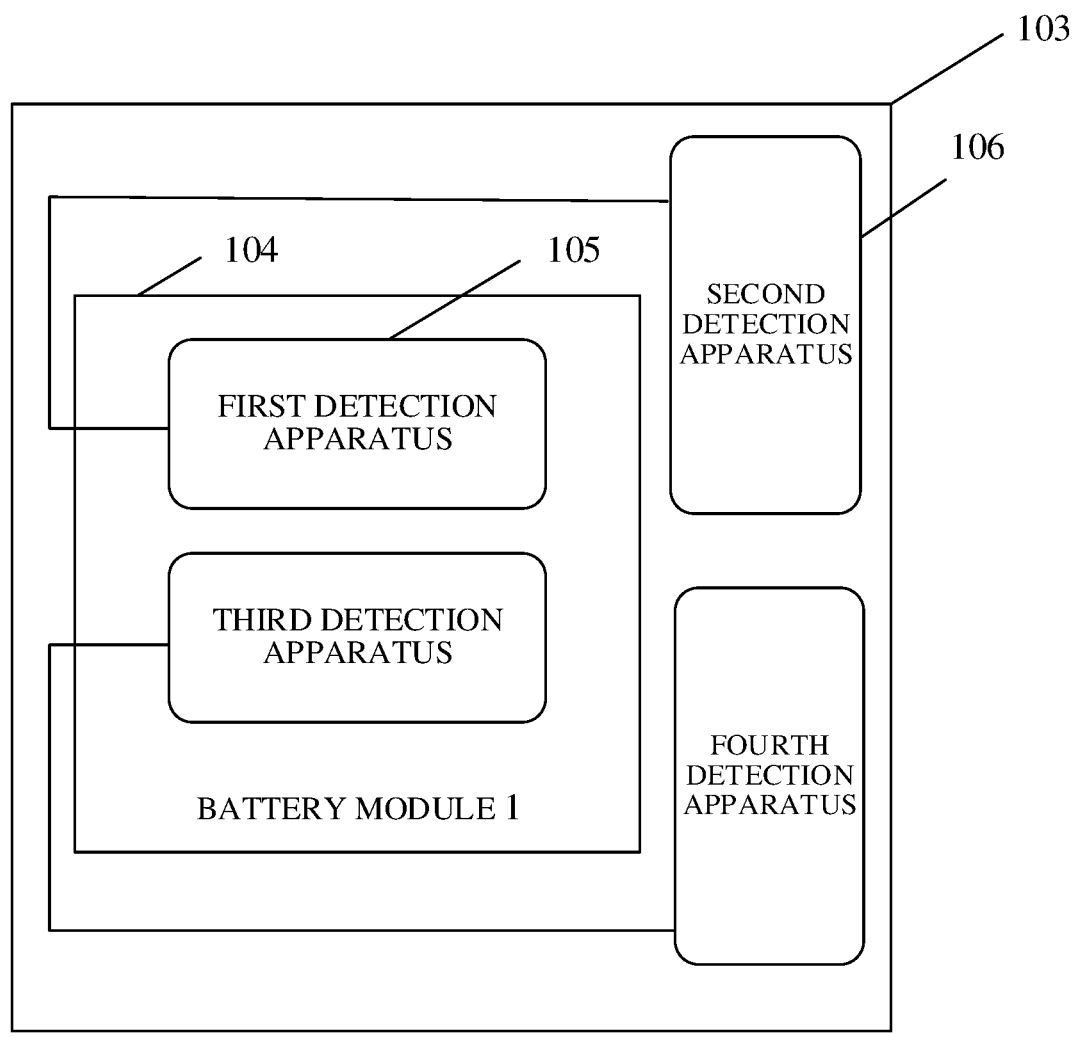
FIG. 1C is a schematic structural diagram of an energy storage unit provided in embodiments of the disclosure.

Referring to FIG. 1C, FIG. 1C is a schematic structural diagram of an energy storage unit provided in embodiments of the disclosure. In a possible implementation, each of the multiple energy storage units further includes a third detection apparatus and a fourth detection apparatus. The third detection apparatus is a backup detection apparatus of the first detection apparatus and configured to detect a third thermal-runaway parameter inside the battery module, and the fourth detection apparatus is a backup detection apparatus of the second detection apparatus and configured to detect a fourth thermal-runaway parameter outside the battery module. After sending the detection-apparatus fault signal to the temperature control apparatus, the method further includes the following operations. A detection request sent, within a first preset time, by the temperature control apparatus is received. The third thermal-runaway parameter inside the battery module and the fourth thermal-runaway parameter outside the battery module are obtained in response to the detection request. Determine that the first detection apparatus fails, if an error between the first thermal-runaway parameter and the third thermal-runaway parameter is greater than a first preset difference, and an error between the second thermal-runaway parameter and the fourth thermal-runaway parameter is less than or equal to a second preset difference. Determine that the second detection apparatus fails, if the error between the first thermal-runaway parameter and the third thermal-runaway parameter is less than or equal to the first preset difference, and the error between the second thermal-runaway parameter and the fourth thermal-runaway parameter is greater than the second preset difference.

Figure 1D:
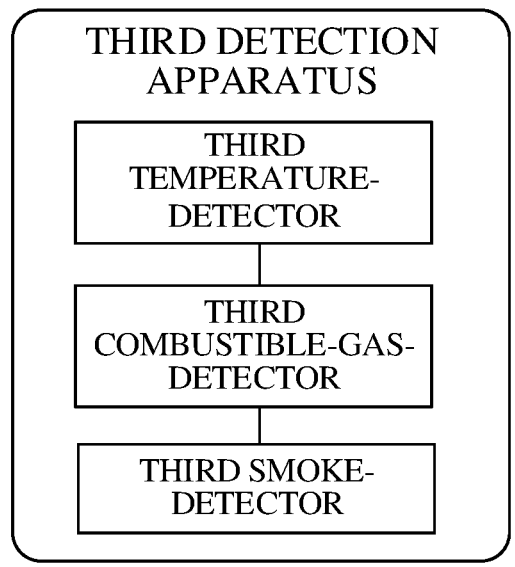
FIG. 1D is a schematic structural diagram of a third detection apparatus provided in embodiments of the disclosure.
Figure 1E:
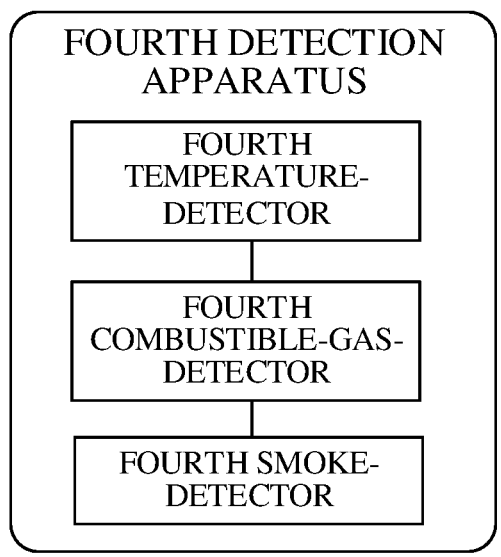
FIG. 1E is a schematic structural diagram of a fourth detection apparatus provided in embodiments of the disclosure.

Referring to FIG. 1D, FIG. 1D is a schematic structural diagram of the third detection apparatus provided in embodiments of the disclosure. In a possible implementation, the third detection apparatus includes a third temperature-detector configured to detect an internal temperature of the battery module, a third combustible-gas-detector configured to detect an internal combustible-gas concentration of the battery module, and a third smoke-detector configured to detect an internal smoke concentration of the battery module. Referring to FIG. 1E, FIG. 1E is a schematic structural diagram of the fourth detection apparatus provided in embodiments of the disclosure. The fourth detection apparatus includes a fourth temperature-detector configured to detect an external temperature of the battery module, a fourth combustible-gas-detector configured to detect an external combustible-gas concentration of the battery module, and a fourth smoke-detector configured to detect an external smoke concentration of the battery module. The third thermal-runaway parameter includes a third temperature detected by the third temperature-detector, a third combustible-gas-concentration detected by the third combustible-gas-detector, and a third smoke-concentration detected by the third smoke-detector. The fourth thermal-runaway parameter includes a fourth temperature detected by the fourth temperature-detector, a fourth combustible-gas-concentration detected by the fourth combustible-gas-detector, and a fourth smoke-concentration detected by the fourth smoke-detector.

Specifically, by using the foregoing method, a detection apparatus corresponding to which battery module fails can be determined from multiple detection apparatuses in a battery cluster, and a fault troubleshooting range is thereby narrowed from detection apparatuses of the whole battery cluster to only two detection apparatuses corresponding to a target battery module. To further narrow the fault troubleshooting range for the repairman, whether the first detection apparatus or the second detection apparatus fails in the two detection apparatus corresponding to the battery module can be determined by means of a backup third detection apparatus and a backup fourth detection apparatus. Before the battery management system receives the detection request sent by the temperature control apparatus, the third detection apparatus and the fourth detection apparatus are in a standby state and do not report detected data to the battery management system. After receiving the detection request sent, within the first preset time, by the temperature control apparatus, the battery management system sends an obtaining request to the third detection apparatus and the fourth detection apparatus. The third detection apparatus and the fourth detection apparatus report detected data to the battery management system in response to the obtaining request.

The first preset time is set to be short, so that the temperature control apparatus sends the detection request to the battery management system once receiving the detection-apparatus fault signal, and thus the third thermal-runaway parameter detected by the third detection apparatus and the fourth thermal-runaway parameter detected by the fourth detection apparatus can be obtained within a short time, and the fault can be determined. Since the first detection apparatus and the backup third detection apparatus detect the same object, and the second detection apparatus and the backup fourth detection apparatus detect the same object, whether the first detection apparatus or the second detection apparatus fails in the two detection apparatuses corresponding to the battery module can be determined by analyzing the first thermal-runaway parameter, the second thermal-runaway parameter, the third thermal-runaway parameter, and the fourth thermal-runaway parameter.

Specifically, for battery module 1, if an error between the first temperature detected by the first detection apparatus and the third temperature detected by the backup third detection apparatus is greater than a temperature error in the first preset difference, and an error between the second temperature detected by the second detection apparatus and the fourth temperature detected by the backup fourth detection apparatus is less than or equal to a temperature error in the second preset difference, it is indicated that the first detection apparatus corresponding to battery module 1 fails, and the first temperature-detector in the first detection apparatus fails. Likewise, for battery module 1, if an error between the first combustible-gas-concentration detected by the first detection apparatus and the third combustible-gas-concentration detected by the backup third detection apparatus is greater than a combustible-gas concentration error in the first preset difference, and an error between the second combustible-gas-concentration detected by the second detection apparatus and the fourth combustible-gas-concentration detected by the backup fourth detection apparatus is less than or equal to a combustible-gas concentration error in the second preset difference, it is indicated that the first detection apparatus corresponding to battery module 1 fails, and the first combustible-gas-detector in the first detection apparatus fails. Likewise, for battery module 1, if an error between the first smoke-concentration detected by the first detection apparatus and the third smoke-concentration detected by the backup third detection apparatus is greater than a smoke concentration error in the first preset difference, and an error between the second smoke-concentration detected by the second detection apparatus and the fourth smoke-concentration detected by the backup fourth detection apparatus is less than or equal to a smoke concentration error in the second preset difference, it is indicated that the first detection apparatus corresponding to battery module 1 fails, and the first smoke-detector in the first detection apparatus fails.

Specifically, for battery module 1, if the error between the first temperature detected by the first detection apparatus and the third temperature detected by the backup third detection apparatus is less than or equal to the temperature error in the first preset difference, and the error between the second temperature detected by the second detection apparatus and the fourth temperature detected by the backup fourth detection apparatus is greater than the temperature error in the second preset difference, it is indicated that the second detection apparatus corresponding to battery module 1 fails, and the second temperature-detector in the second detection apparatus fails. Likewise, for battery module 1, if the error between the first combustible-gas-concentration detected by the first detection apparatus and the concentration of the third combustible-gas-concentration detected by the backup third detection apparatus is less than or equal to the combustible-gas concentration error in the first preset difference, the error between the second combustible-gas-concentration detected by the second detection apparatus and the fourth combustible-gas-concentration detected by the backup fourth detection apparatus is greater than the combustible-gas concentration error in the second preset difference, it is indicated that the second detection apparatus corresponding to battery module 1 fails, and the second combustible-gas-detector in the second detection apparatus fails. Likewise, for battery module 1, if the error between the first smoke-concentration detected by the first detection apparatus and the third smoke-concentration detected by the backup third detection apparatus is less than or equal to the smoke concentration error in the first preset difference, and the error between the second smoke-concentration detected by the second detection apparatus and the fourth smoke-concentration detected by the backup fourth detection apparatus is greater than the smoke concentration error in the second preset difference, it is indicated that the second detection apparatus corresponding to battery module 1 fails, and the second smoke-detector in the second detection apparatus fails.

It can be seen that, in embodiments of the disclosure, by comparing the error between the first thermal-runaway parameter detected by the first detection apparatus and the third thermal-runaway parameter detected by the third detection apparatus with the first preset difference, and comparing the error between the second thermal-runaway parameter detected by the second detection apparatus and the fourth thermal-runaway parameter detected by the fourth detection apparatus with the second preset difference, whether the first detection apparatus or the second detection apparatus fails can be further determined, and which detector in the detection apparatus fails can be further determined, to facilitate maintenance of the repairman.

In a possible implementation, the method further includes the following. A first fault-type evaluation parameter within a second preset time is obtained based on a determination that the first detection apparatus fails, and a fault type of the first detection apparatus is determined according to the first fault-type evaluation parameter. A second fault-type evaluation parameter within the second preset time is obtained based on a determination that the second detection apparatus fails, and a fault type of the second detection apparatus is determined according to the second fault-type evaluation parameter. The fault type includes a failure and a deviation, where the failure indicates that a detected value of a detector is always a fixed value, and the deviation indicates that the detected value is different from an actual value.

Specifically, the fault of the detection apparatus has more than one type, and knowing a specific fault type can facilitate the repairman to process the fault according to a corresponding fault type.

Exemplarily, if the first temperature-detector in the first detection apparatus fails, the first fault-type evaluation parameter may be a first-temperature data set $(T_{11}, T_{12}, \ldots, T_{1N})$ detected, within a preset period, by the first temperature-detector and a third-temperature data set $(T_{31}, T_{32}, \ldots, T_{3N})$ detected, within the preset period, by the backup third temperature-detector. The first-temperature data set $(T_{11}, T_{12}, \ldots, T_{1N})$ and the third-temperature data set $(T_{31}, T_{32}, \ldots, T_{3N})$ are input into a fault-type determination model to obtain an output result of a fault type of the first temperature-detector. If the second temperature-detector in the second detection apparatus fails, the second fault-type evaluation parameter may be a second-temperature data set $(T_{21}, T_{22}, \ldots, T_{2N})$ detected, within the preset period, by the second temperature-detector and the fourth-temperature data set $(T_{41}, T_{42}, \ldots, T_{4N})$ detected, within the preset period, by the backup fourth temperature-detector. The second-temperature data set $(T_{21}, T_{22}, \ldots, T_{2N})$ and the fourth-temperature data set $(T_{41}, T_{42}, \ldots, T_{4N})$ are input into the fault-type determination model to obtain an output result of a fault type of the second temperature-detector. Similarly, if other detectors of the first detection apparatus or the second detection apparatus fail, the fault-type determination method is similar to the above method and will not be explained in detail herein.

The fault-type determination model may is a neural network model. The neural network model is trained by using the historical fault data of a detection apparatus as a training sample. During the training, data detected by the detection apparatus is regarded as input of the neural network model, and a fault type corresponding to the detected data is regarded as output of the neural network model. When the output of the neural network model is (1, 0), it is indicated that the fault type of the detector is a failure. When the output of the neural network model is (0, 1), it is indicated that the fault type of the detector is a deviation.

It can be seen that, in embodiments of the disclosure, the fault type of the detector can be further determined according to a fault-type evaluation parameter based on a determination that the first detection apparatus or the second detection apparatus fails, thus facilitating the repairman to take corresponding maintenance measures for the specific fault type and improve the work efficiency.

In a possible implementation, the method further includes the following. Determine that the battery module fails, if the second thermal-runaway parameter and the fourth thermal-runaway parameter each are greater than the second threshold, based on a determination that the first detection apparatus fails. Determine that the battery module fails, if the first thermal-runaway parameter and the third thermal-runaway parameter each are greater than the first threshold, based on a determination that the second detection apparatus fails.

Specifically, based on the determination that the first detection apparatus fails, whether the battery module also fails is further determined by means of the second detection apparatus that does not fail and the backup fourth detection apparatus corresponding to the second detection apparatus. Exemplarily, the first detection apparatus corresponding to battery module 1 fails. If both the second temperature detected by the second detection apparatus corresponding to battery module 1 and the fourth temperature detected by the fourth detection apparatus corresponding to battery module 1 are greater than the second temperature-threshold, it is indicated that battery module 1 fails. Alternatively, if both the second combustible-gas-concentration detected by the second detection apparatus corresponding to battery module 1 and the fourth combustible-gas-concentration detected by the fourth detection apparatus corresponding to battery module 1 are greater than the second gas-concentration-threshold, it is indicated that battery module 1 fails. Alternatively, if both the second smoke-concentration detected by the second detection apparatus corresponding to battery module 1 and the fourth smoke-concentration detected by the fourth detection apparatus corresponding to battery module 1 are greater than the second smoke-concentration-threshold, it is indicated that battery module 1 fails.

Specifically, based on the determination that the second detection apparatus fails, whether the battery module also fails is further determined by means of the first detection apparatus that does not fail and the backup third detection apparatus corresponding to the first detection apparatus. Exemplarily, the second detection apparatus corresponding to battery module 1 fails. If both the first temperature detected by the first detection apparatus corresponding to battery module 1 and the third temperature detected by the third detection apparatus corresponding to battery module 1 are greater than the first temperature-threshold, it is indicated that battery module 1 fails. Alternatively, if both the first combustible-gas-concentration detected by the first detection apparatus corresponding to battery module 1 and the third combustible-gas-concentration detected by the third detection apparatus corresponding to battery module 1 are greater than the first gas-concentration-threshold, it is indicated that the battery module 1 fails. Alternatively, if both the first smoke-concentration detected by the first detection apparatus corresponding to battery module 1 and the third smoke-concentration detected by the third detection apparatus corresponding to battery module 1 are greater than the first smoke-concentration-threshold, it is indicated that the battery module 1 fails.

It can be seen that, in embodiments of the disclosure, after that the first detection apparatus fails is detected, whether the battery module fails can be further determined by means of the second detection apparatus and the fourth detection apparatus that operate normally. Alternatively, after that the second detection apparatus fails is detected, whether the battery module fails can be further determined by means of the first detection apparatus and the third detection apparatus that operate normally. In this way, a fault can be troubleshot more comprehensively, thus avoiding the problem of not being able to determine whether the battery module fails due to a fault of the detector, and improving the comprehensiveness of fault diagnosis.

In a possible implementation, the method further includes the following. Determine that both the first detection apparatus and the second detection apparatus of a first battery module in multiple battery modules fail, if an error between the first thermal-runaway parameter and the third thermal-runaway parameter of the first battery module is greater than the first preset difference, and an error between the second thermal-runaway parameter and the fourth thermal-runaway parameter of the first battery module is greater than the second preset difference. Determine that both the first detection apparatus and the second detection apparatus of a second battery module adjacent to the first battery module in the multiple battery modules do not fail, if an error between the first thermal-runaway parameter and the third thermal-runaway parameter of the second battery module is less than or equal to the first preset difference, and an error between the second thermal-runaway parameter and the fourth thermal-runaway parameter of the second battery module is less than or equal to the second preset difference. Determine that the first battery module fails, when the first thermal-runaway parameter detected by the first detection apparatus of the second battery module is less than or equal to the first threshold, and the second thermal-runaway parameter detected by the second detection apparatus of the second battery module is greater than a third threshold, if both the first detection apparatus and the second detection apparatus of the first battery module fail, and both the first detection apparatus and the second detection apparatus of the second battery module do not fail.

Specifically, if both the first detection apparatus and the second detection apparatus corresponding to battery module 1 fail, battery module 1 is the first battery module, and battery module 2 adjacent to battery module 1 is the second battery module. When both the first detection apparatus and the second detection apparatus corresponding to battery module 2 operate normally, if none of the first temperature, the first combustible-gas-concentration, and the first smoke-concentration detected by the first detection apparatus corresponding to battery module 2 exceeds the first threshold, and one of the second temperature, the second combustible-gas-concentration, and the second smoke-concentration detected by the second detection apparatus corresponding to battery module 2 exceeds the third threshold, it is indicated that battery module 2 does not fail, but battery module 1 fails, and the detection apparatus corresponding to battery module 2 has monitored changes of the thermal runaway parameters caused by the fault of battery module 1.

The third threshold is less than the second threshold, the second threshold is less than the first threshold, and the third threshold is an indicator used to monitor whether an adjacent battery module fails.

It can be seen that, in embodiments of the disclosure, in a case where both the first detection apparatus and the second detection apparatus of the first battery module fail, whether the first battery module fails can be determined by means of a detection apparatus of the adjacent second battery module, thus avoiding that the operating state of the battery module cannot be monitored due to fault of the detection apparatuses.

In a possible implementation, the method further includes the following. The battery management system sends a request message to a server, where the request message includes an identity of the battery management system, and is used to instruct the server to send a maintenance message to a user equipment bound to the battery management system.

The battery management system is coupled with the server via a wireless communication interface. The identity of the battery management system may be a preset code, where the code is used to identify which battery management system it is when the battery management system sends a request to the server. The server is configured to store a correspondence table of identities of battery management systems and identities of user equipment of the repairman. According to the correspondence table, the battery management system can send the maintenance message to the associated user equipment through the server, where the maintenance message may include a failed object, a fault type, and a fault location, so that the repairman can obtain the fault information as soon as possible, and thus can maintain the fault point in time.

207, obtain location information of the failed battery module when the battery module fails, and send a battery-module fault signal to the temperature control apparatus, where the battery-module fault signal includes the location information of the failed battery module.

Specifically, the location information of the failed battery module may be a code assigned to the battery module by the battery management system. According to the code, one or more failed battery modules can be informed to the repairman. For example, a code corresponding to battery module 1 is 00100, a code corresponding to battery module 2 is 01000, and a code corresponding to battery module 3 is 01100. If battery module 3 fails, the battery management system sends 01100 to the temperature control apparatus, and 01100 is accordingly displayed on the display screen of the temperature control apparatus. The repairman determines that battery module 3 fails once seeing 01100, such that the repairman can quickly locate the failed battery module and maintain it.

Figure 3:
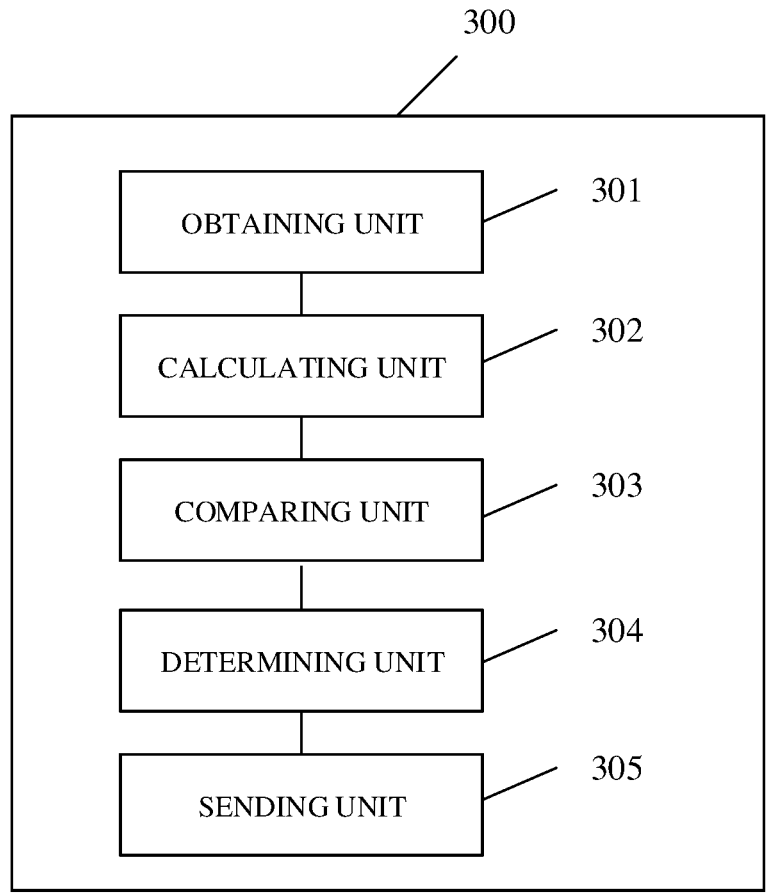
FIG. 3 is a schematic structural diagram of a battery management system provided in embodiments of the disclosure.

Referring to FIG. 3, FIG. 3 is a schematic structural diagram of a battery management system provided in embodiments of the disclosure. As illustrated in FIG. 3, a battery management system 300 includes an obtaining unit 301, a calculating unit 302, a comparing unit 303, a determining unit 304, and a sending unit 305. These units are described in detail as follows.

The obtaining unit 301 is configured to obtain the first thermal-runaway parameter detected by the first detection apparatus of each of the multiple energy storage units and the second thermal-runaway parameter detected by the second detection apparatus of each of the multiple energy storage units.

The calculating unit 302 is configured to calculate a difference between the first thermal-runaway parameter and the second thermal-runaway parameter.

The comparing unit 303 is configured to compare the difference with a difference threshold.

The determining unit 304 is configured to determine that at least one of the first detection apparatus or the second detection apparatus fails, if the difference is greater than the difference threshold; and further configured to determine that the battery module fails, if the first thermal-runaway parameter is greater than a first threshold, the second thermal-runaway parameter is greater than a second threshold, and the difference is less than or equal to the difference threshold.

The sending unit 305 is configured to obtain location information of the first detection apparatus and location information of the second detection apparatus when the at least one of the first detection apparatus or the second detection apparatus fails, and send a detection-apparatus fault signal to the temperature control apparatus, where the detection-apparatus fault signal includes the location information of the first detection apparatus and the location information of the second detection apparatus; and further configured to obtain location information of the failed battery module when the battery module fails, and send a battery-module fault signal to the temperature control apparatus, where the battery-module fault signal includes the location information of the failed battery module.

In a possible implementation, the calculating unit 302 is further configured to calculate a temperature difference between the first temperature and the second temperature, a gas concentration difference between the first combustible-gas-concentration and the second combustible-gas-concentration, and a smoke concentration difference between the first smoke-concentration and the second smoke-concentration.

In a possible implementation, each of the multiple energy storage units of an energy storage system further includes a third detection apparatus and a fourth detection apparatus. The third detection apparatus is a backup detection apparatus of the first detection apparatus and configured to detect a third thermal-runaway parameter inside the battery module, and the fourth detection apparatus is a backup detection apparatus of the second detection apparatus and configured to detect a fourth thermal-runaway parameter outside the battery module. The determining unit 304 is further configured to receive a detection request sent, within a first preset time, by the temperature control apparatus; obtain the third thermal-runaway parameter inside the battery module and the fourth thermal-runaway parameter outside the battery module in response to the detection request; determine that the first detection apparatus fails, if an error between the first thermal-runaway parameter and the third thermal-runaway parameter is greater than a first preset difference, and an error between the second thermal-runaway parameter and the fourth thermal-runaway parameter is less than or equal to a second preset difference; and determine that the second detection apparatus fails, if the error between the first thermal-runaway parameter and the third thermal-runaway parameter is less than or equal to the first preset difference, and the error between the second thermal-runaway parameter and the fourth thermal-runaway parameter is greater than the second preset difference.

In a possible implementation, the determining unit 304 is further configured to obtain a first fault-type evaluation parameter within a second preset time based on a determination that the first detection apparatus fails, and determine a fault type of the first detection apparatus according to the first fault-type evaluation parameter; and obtain a second fault-type evaluation parameter within the second preset time based on a determination that the second detection apparatus fails, and determine a fault type of the second detection apparatus according to the second fault-type evaluation parameter. The fault type includes a failure and a deviation, the failure indicates that a detected value of a detector is always a fixed value, and the deviation indicates that the detected value is different from an actual value.

In a possible implementation, the determining unit 304 is further configured to determine that the battery module fails, if the second thermal-runaway parameter and the fourth thermal-runaway parameter each are greater than the second threshold, based on a determination that the first detection apparatus fails; and determine that the battery module fails, if the first thermal-runaway parameter and the third thermal-runaway parameter each are greater than the first threshold, based on a determination that the second detection apparatus fails.

In a possible implementation, the determining unit 304 is further configured to obtain a difference-threshold evaluation parameter, where the difference-threshold evaluation parameter includes a battery cell type, a thermal-runaway parameter type, historical data of the first thermal-runaway parameter stored on the battery management system, and historical data of the second thermal-runaway parameter stored on the battery management system; and determine the difference threshold according to the difference-threshold evaluation parameter.

In a possible implementation, the determining unit 304 is further configured to determine that both the first detection apparatus and the second detection apparatus of a first battery module in multiple battery modules fail, if an error between the first thermal-runaway parameter and the third thermal-runaway parameter of the first battery module is greater than the first preset difference, and an error between the second thermal-runaway parameter and the fourth thermal-runaway parameter of the first battery module is greater than the second preset difference. The determining unit 304 is further configured to determine that both the first detection apparatus and the second detection apparatus of a second battery module adjacent to the first battery module in the multiple battery modules do not fails, if an error between the first thermal-runaway parameter and the third thermal-runaway parameter of the second battery module is less than or equal to the first preset difference, and an error between the second thermal-runaway parameter and the fourth thermal-runaway parameter of the second battery module is less than or equal to the second preset difference. The determining unit 304 is further configured to determine that the first battery module fails, when the first thermal-runaway parameter detected by the first detection apparatus of the second battery module is less than or equal to the first threshold, and the second thermal-runaway parameter detected by the second detection apparatus of the second battery module is greater than a third threshold, if both the first detection apparatus and the second detection apparatus of the first battery module fail, and both the first detection apparatus and the second detection apparatus of the second battery module do not fail.

In a possible implementation, the third threshold is less than the second threshold.

In a possible implementation, the first detection apparatus includes a first temperature-detector configured to detect an internal temperature of the battery module, a first combustible-gas-detector configured to detect an internal combustible-gas concentration of the battery module, and a first smoke-detector configured to detect an internal smoke concentration of the battery module. The second detection apparatus includes a second temperature-detector configured to detect an external temperature of the battery module, a second combustible-gas-detector configured to detect an external combustible-gas concentration of the battery module, and a second smoke-detector configured to detect an external smoke concentration of the battery module. The first thermal-runaway parameter includes a first temperature detected by the first temperature-detector, a first combustible-gas-concentration detected by the first combustible-gas-detector, and a first smoke-concentration detected by the first smoke-detector. Additionally, the second thermal-runaway parameter includes a second temperature detected by the second temperature-detector, a second combustible-gas-concentration detected by the second combustible-gas-detector, and a second smoke-concentration detected by the second smoke-detector.

In a possible implementation, the determining unit 304 is further configured to determine that at least one of the first temperature-detector or the second temperature-detector fails, if the temperature difference is greater than a temperature difference threshold. The determining unit 304 is further configured to determine that at least one of the first combustible-gas-detector or the second combustible-gas-detector fails, if the gas concentration difference is greater than a gas-concentration difference threshold. The determining unit 304 is further configured to determine that at least one of the first smoke-detector or the second smoke-detector fails, if the smoke concentration difference is greater than a smoke-concentration difference threshold.

In a possible implementation, the determining unit 304 is further configured to determine that the battery module fails, if the first temperature is greater than a first temperature-threshold, the second temperature is greater than a second temperature-threshold, and the temperature difference is less than or equal to a temperature difference threshold. Alternatively, the determining unit 304 is further configured to determine that the battery module fails, if the first combustible-gas-concentration is greater than a first gas-concentration-threshold, the second combustible-gas-concentration is greater than a second gas-concentration-threshold, and the gas concentration difference is less than or equal to a gas-concentration difference threshold. Alternatively, the determining unit 304 is further configured to determine that the battery module fails, if the first smoke-concentration is greater than a first smoke-concentration-threshold, the second smoke-concentration is greater than a second smoke-concentration-threshold, and the smoke concentration difference is less than or equal to a smoke-concentration difference threshold.

In a possible implementation, the third detection apparatus includes a third temperature-detector configured to detect an internal temperature of the battery module, a third combustible-gas-detector configured to detect an internal combustible-gas concentration of the battery module, and a third smoke-detector configured to detect an internal smoke concentration of the battery module. The fourth detection apparatus includes a fourth temperature-detector configured to detect an external temperature of the battery module, a fourth combustible-gas-detector configured to detect an external combustible-gas concentration of the battery module, and a fourth smoke-detector configured to detect an external smoke concentration of the battery module. The third thermal-runaway parameter includes a third temperature detected by the third temperature-detector, a third combustible-gas-concentration detected by the third combustible-gas-detector, and a third smoke-concentration detected by the third smoke-detector. Additionally, the fourth thermal-runaway parameter includes a fourth temperature detected by the fourth temperature-detector, a fourth combustible-gas-concentration detected by the fourth combustible-gas-detector, and a fourth smoke-concentration detected by the fourth smoke-detector.

Figure 4:
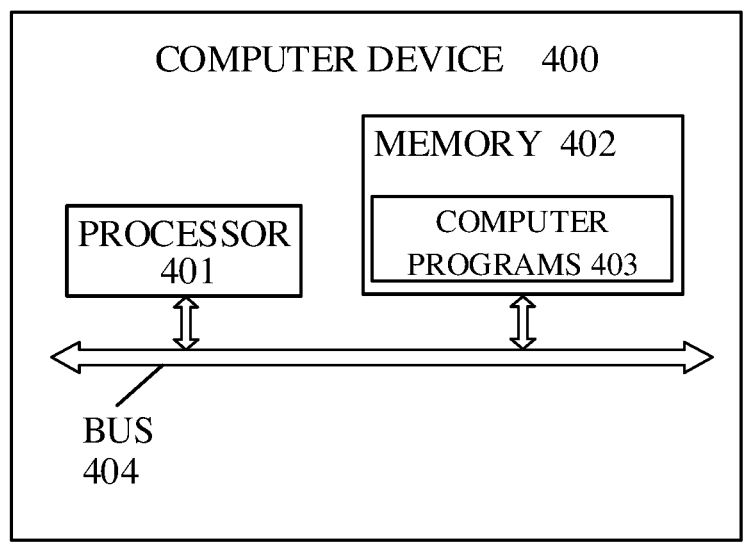
FIG. 4 is a schematic structural diagram of a computer device provided in embodiments of the disclosure.

Refer to FIG. 4, FIG. 4 is a schematic structural diagram of a computer device provided in embodiments of the disclosure. As illustrated in FIG. 4, a computer device 400 includes a processor 401 and a memory 402 configured to store computer programs 403. The processor 401 and the memory 402 are coupled together through a bus 404. The computer programs 403 are configured to execute part or all operations of the method of the foregoing method embodiments.

In embodiments of the disclosure, the processor 401 may be a central processing unit (CPU), and may further be a general-purpose processor, a digital signal processing (DSP), an application specific integrated circuit (ASIC), a field-programmable gate array (FPGA), or other programmable logic devices, discrete gates or transistor logic devices, discrete hardware components.

In embodiments of the disclosure, the memory 402 may be a volatile memory or a non-volatile memory, or may include both the volatile memory and the non-volatile memory. The non-volatile memory may be a read-only memory (ROM), a programmable ROM (PROM), an erasable PROM (EPROM), an electrically EPROM (EEPROM), or a flash memory. The volatile memory may be a random access memory (RAM) that acts as an external cache. By way of example and without limitation, many forms of RAMs are available, such as a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct rambus RAM (DR RAM).

It should be noted that, when the processor 401 is a general-purpose processor, a DSP, an ASIC, an FPGA, or other programmable logic devices, discrete gate or transistor logic devices, or discrete hardware components, the memory (memory module) is integrated in the processor.

It should be noted that the memory 402 described herein is intended to include but not limited to these and any other suitable types of memory.

In addition to data bus, the bus 404 may also include a power bus, a control bus, a status signal bus, etc. However, for the sake of clarity, various buses are marked as buses in the drawings.

During implementation, the operations of the foregoing method may be completed by an integrated logic circuit of hardware in the processor or an instruction in the form of software. Operations of the method provided in embodiments of the disclosure may be directly implemented by a hardware processor, or may be performed by hardware and software modules in the processor. The software module may be located in a storage medium such as a RAM, a flash memory, a ROM, a PROM, or an electrically erasable programmable memory, a register, and the like. The storage medium is located in the memory. The processor is configured to read information in the memory, and complete the operations of the method described above with the hardware thereof. To avoid repetition, it is not described in detail here.

In various embodiments described herein, the magnitude of a sequence number of each process does not mean an order of execution, and the order of execution of each process should be determined by its function and an internal logic and shall not constitute any limitation to an implementation process of embodiments of the disclosure.

Those of ordinary skill in the art can realize that various illustrative logical blocks (ILB) and operations described in combination with embodiments of the disclosure can be realized by electronic hardware or the combination of computer software and electronic hardware. Whether these functions are implemented in hardware or software depends on the specific application and design constraints of the technical solution. Those of ordinary skill in the art can use different methods to achieve the described functions for each specific application, but such implementation should not be considered beyond the scope of the disclosure.

In embodiments of the disclosure, it should be appreciated that the system, apparatus, and method provided may also be implemented in other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device, or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

Various functional units described in embodiments of the disclosure may be integrated into one processing unit or may be presented as a number of physically separated units, and two or more units may be integrated into one.

All or part of the above embodiments can be implemented through software, hardware, firmware, or any other combination thereof. When implemented by software, all or part of the above embodiments can be implemented in the form of a computer program product. The computer program product includes one or more computer instructions. When the computer instructions are loaded and executed on a computer, all or part of the operations or functions of the embodiments of the disclosure are performed. The computer may be a general-purpose computer, a special-purpose computer, a computer network, or other programmable apparatuses. The computer instruction can be stored in a computer readable storage medium, or transmitted from one computer readable storage medium to another computer readable storage medium. For example, the computer instruction can be transmitted from one website, computer, server, or data center to another website, computer, server, or data center in a wired manner or in a wireless manner. Examples of the wired manner may be a coaxial cable, an optical fibre, a digital subscriber line (DSL), etc. The wireless manner may be, for example, infrared, wireless, microwave, etc. The computer readable storage medium may be any computer accessible usable-medium or a data storage device such as a server, a data centre, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

In embodiments described above, the computer readable storage medium may mainly include a program storage area and a data storage area. The program storage area can store an operating system, an application program required by at least one function, and the like. The data storage area can store data created according to the use of block chain nodes, and the like. For example, a semantic recognition model such as an automatic speech recognition (ASR) algorithm may be pre-set in the block chain, which is not limited herein.

The block chain mentioned in embodiments of the disclosure is a new application mode of computer technologies such as distributed data storage, point-to-point transmission, a consensus mechanism, and an encryption algorithm. A block chain is essentially a decentralized database, and is a series of data blocks generated in association by using a cryptology method. Each data block contains information about a batch of network transactions, for verifying the validity (anti-counterfeiting) of the information thereof and generating a next block. The block chain may include a block chain underlying platform, a platform product service layer, an application service layer, and the like.

The foregoing illustration are merely specific implementations of the disclosure, but are not intended to limit the protection scope of the disclosure. Any variation or replacement readily figured out by those skilled in the art within the technical scope of the disclosure shall belong to the protection scope of the disclosure.

What is claimed is:

1. A method for fault diagnosis, applied to a battery management system of an energy storage system, the energy storage system comprising the battery management system, a temperature control apparatus, and a plurality of energy storage units, each of the plurality of energy storage units comprising a battery module, a first detection apparatus, and a second detection apparatus, the first detection apparatus being configured to detect a first thermal-runaway parameter inside the battery module, the second detection apparatus being configured to detect a second thermal-runaway parameter outside the battery module, the first detection apparatus and the second detection apparatus of each of the plurality of energy storage units being in communication connection with the battery management system, and the method comprising:
 obtaining the first thermal-runaway parameter detected by the first detection apparatus of each of the plurality of energy storage units and the second thermal-runaway parameter detected by the second detection apparatus of each of the plurality of energy storage units;
 calculating a difference between the first thermal-runaway parameter and the second thermal-runaway parameter;
 comparing the difference with a difference threshold;
 determining that at least one of the first detection apparatus or the second detection apparatus fails, when the difference is greater than the difference threshold;
 determining that the battery module fails, when the first thermal-runaway parameter is greater than a first threshold, the second thermal-runaway parameter is greater than a second threshold, and the difference is less than or equal to the difference threshold;
 obtaining location information of the first detection apparatus and location information of the second detection apparatus when the at least one of the first detection apparatus or the second detection apparatus fails, and sending a detection-apparatus fault signal to the temperature control apparatus, wherein the detection-apparatus fault signal comprises the location information of the first detection apparatus and the location information of the second detection apparatus; and
 obtaining location information of the failed battery module when the battery module fails, and sending a battery-module fault signal to the temperature control apparatus, wherein the battery-module fault signal comprises the location information of the failed battery module, wherein
 each of the plurality of energy storage units further comprises a third detection apparatus and a fourth detection apparatus, the third detection apparatus is a backup detection apparatus of the first detection apparatus and configured to detect a third thermal-runaway parameter inside the battery module, the fourth detection apparatus is a backup detection apparatus of the second detection apparatus and configured to detect a fourth thermal-runaway parameter outside the battery module, and after sending the detection-apparatus fault signal to the temperature control apparatus, the method further comprises:
  receiving a detection request sent, within a first preset time, by the temperature control apparatus;
  obtaining the third thermal-runaway parameter inside the battery module and the fourth thermal-runaway parameter outside the battery module in response to the detection request;
  determining that the first detection apparatus fails, when an error between the first thermal-runaway parameter and the third thermal-runaway parameter is greater than a first preset difference, and an error between the second thermal-runaway parameter and the fourth thermal-runaway parameter is less than or equal to a second preset difference; and
  determining that the second detection apparatus fails, when the error between the first thermal-runaway parameter and the third thermal-runaway parameter is less than or equal to the first preset difference, and the error between the second thermal-runaway parameter and the fourth thermal-runaway parameter is greater than the second preset difference.

2. The method of claim 1, further comprising:
 obtaining a first fault-type evaluation parameter within a second preset time based on a determination that the first detection apparatus fails, and determining a fault type of the first detection apparatus according to the first fault-type evaluation parameter; and
 obtaining a second fault-type evaluation parameter within the second preset time based on a determination that the second detection apparatus fails, and determining a fault type of the second detection apparatus according to the second fault-type evaluation parameter, wherein
 the fault type comprises a failure and a deviation, the failure indicates that a detected value of a detector is always a fixed value, and the deviation indicates that the detected value is different from an actual value.

3. The method of claim 1, further comprising:
 determining that the battery module fails, when the second thermal-runaway parameter and the fourth thermal-runaway parameter each are greater than the second threshold, based on a determination that the first detection apparatus fails; and
 determining that the battery module fails, when the first thermal-runaway parameter and the third thermal-runaway parameter each are greater than the first threshold, based on a determination that the second detection apparatus fails.

4. The method of claim 3, wherein before comparing the difference with the difference threshold, the method further comprises:
 obtaining a difference-threshold evaluation parameter, wherein the difference-threshold evaluation parameter comprises a battery cell type, a thermal-runaway parameter type, historical data of the first thermal-runaway parameter stored on the battery management system, and historical data of the second thermal-runaway parameter stored on the battery management system; and
 determining the difference threshold according to the difference-threshold evaluation parameter.

5. The method of claim 4, further comprising:
 determining that both the first detection apparatus and the second detection apparatus of a first battery module in a plurality of battery modules fail, when an error between the first thermal-runaway parameter and the third thermal-runaway parameter of the first battery module is greater than the first preset difference, and an error between the second thermal-runaway parameter and the fourth thermal-runaway parameter of the first battery module is greater than the second preset difference;
 determining that both the first detection apparatus and the second detection apparatus of a second battery module adjacent to the first battery module in the plurality of battery modules do not fail, when an error between the first thermal-runaway parameter and the third thermal-runaway parameter of the second battery module is less than or equal to the first preset difference, and an error between the second thermal-runaway parameter and the fourth thermal-runaway parameter of the second battery module is less than or equal to the second preset difference; and determining that the first battery module fails, when the first thermal-runaway parameter detected by the first detection apparatus of the second battery module is less than or equal to the first threshold, and the second thermal-runaway parameter detected by the second detection apparatus of the second battery module is greater than a third threshold, when both the first detection apparatus and the second detection apparatus of the first battery module fail, and both the first detection apparatus and the second detection apparatus of the second battery module do not fail.

6. The method of claim 5, wherein the third threshold is less than the second threshold.

7. The method of claim 1, wherein
the first detection apparatus comprises a first temperature-detector configured to detect an internal temperature of the battery module, a first combustible-gas-detector configured to detect an internal combustible-gas concentration of the battery module, and a first smoke-detector configured to detect an internal smoke concentration of the battery module;
the second detection apparatus comprises a second temperature-detector configured to detect an external temperature of the battery module, a second combustible-gas-detector configured to detect an external combustible-gas concentration of the battery module, and a second smoke-detector configured to detect an external smoke concentration of the battery module;
the first thermal-runaway parameter comprises a first temperature detected by the first temperature-detector, a first combustible-gas-concentration detected by the first combustible-gas-detector, and a first smoke-concentration detected by the first smoke-detector; and
the second thermal-runaway parameter comprises a second temperature detected by the second temperature-detector, a second combustible-gas-concentration detected by the second combustible-gas-detector, and a second smoke-concentration detected by the second smoke-detector.

8. The method of claim 7, wherein calculating the difference between the first thermal-runaway parameter and the second thermal-runaway parameter comprises:
calculating a temperature difference between the first temperature and the second temperature;
calculating a gas concentration difference between the first combustible-gas-concentration and the second combustible-gas-concentration; and
calculating a smoke concentration difference between the first smoke-concentration and the second smoke-concentration.

9. The method of claim 8, wherein determining that the at least one of the first detection apparatus or the second detection apparatus fails, when the difference is greater than the difference threshold comprises:
determining that at least one of the first temperature-detector or the second temperature-detector fails, when the temperature difference is greater than a temperature difference threshold;
determining that at least one of the first combustible-gas-detector or the second combustible-gas-detector fails, when the gas concentration difference is greater than a gas-concentration difference threshold; and
determining that at least one of the first smoke-detector or the second smoke-detector fails, when the smoke concentration difference is greater than a smoke-concentration difference threshold.

10. The method of claim 8, wherein determining that the battery module fails, when the first thermal-runaway parameter is greater than the first threshold, the second thermal-runaway parameter is greater than the second threshold, and the difference is less than or equal to the difference threshold comprises:
determining that the battery module fails, when the first temperature is greater than a first temperature-threshold, the second temperature is greater than a second temperature-threshold, and the temperature difference is less than or equal to a temperature difference threshold; or
determining that the battery module fails, when the first combustible-gas-concentration is greater than a first gas-concentration-threshold, the second combustible-gas-concentration is greater than a second gas-concentration-threshold, and the gas concentration difference is less than or equal to a gas-concentration difference threshold; or
determining that the battery module fails, when the first smoke-concentration is greater than a first smoke-concentration-threshold, the second smoke-concentration is greater than a second smoke-concentration-threshold, and the smoke concentration difference is less than or equal to a smoke-concentration difference threshold.

11. The method of claim 1, wherein
the third detection apparatus comprises a third temperature-detector configured to detect an internal temperature of the battery module, a third combustible-gas-detector configured to detect an internal combustible-gas concentration of the battery module, and a third smoke-detector configured to detect an internal smoke concentration of the battery module;
the fourth detection apparatus comprises a fourth temperature-detector configured to detect an external temperature of the battery module, a fourth combustible-gas-detector configured to detect an external combustible-gas concentration of the battery module, and a fourth smoke-detector configured to detect an external smoke concentration of the battery module;
the third thermal-runaway parameter comprises a third temperature detected by the third temperature-detector, a third combustible-gas-concentration detected by the third combustible-gas-detector, and a third smoke-concentration detected by the third smoke-detector; and
the fourth thermal-runaway parameter comprises a fourth temperature detected by the fourth temperature-detector, a fourth combustible-gas-concentration detected by the fourth combustible-gas-detector, and a fourth smoke-concentration detected by the fourth smoke-detector.

12. A computer device, comprising a processor and a memory coupled with the processor and configured to store computer programs, which are configured to be performed by the processor and comprise instructions configured to perform:
obtaining a first thermal-runaway parameter detected by a first detection apparatus of each of a plurality of energy storage units of an energy storage system and a second thermal-runaway parameter detected by a second detection apparatus of each of the plurality of energy storage units, the energy storage system comprising the computer device, a temperature control apparatus, and the plurality of energy storage units, each of the plurality of energy storage units comprising a battery module, the first detection apparatus, and the second detection apparatus, the first detection apparatus being configured to detect the first thermal-runaway parameter inside the battery module, the second detection apparatus being configured to detect the second thermal-runaway parameter outside the battery module, the first detection apparatus and the second detection apparatus of each of the plurality of energy storage units being in communication connection with the computer device;

calculating a difference between the first thermal-runaway parameter and the second thermal-runaway parameter;

comparing the difference with a difference threshold;

determining that at least one of the first detection apparatus or the second detection apparatus fails, when the difference is greater than the difference threshold;

determining that the battery module fails, when the first thermal-runaway parameter is greater than a first threshold, the second thermal-runaway parameter is greater than a second threshold, and the difference is less than or equal to the difference threshold;

obtaining location information of the first detection apparatus and location information of the second detection apparatus when the at least one of the first detection apparatus or the second detection apparatus fails, and sending a detection-apparatus fault signal to the temperature control apparatus, wherein the detection-apparatus fault signal comprises the location information of the first detection apparatus and the location information of the second detection apparatus; and obtaining location information of the failed battery module when the battery module fails, and sending a battery-module fault signal to the temperature control apparatus, wherein the battery-module fault signal comprises the location information of the failed battery module, wherein each of the plurality of energy storage units further comprises a third detection apparatus and a fourth detection apparatus, the third detection apparatus is a backup detection apparatus of the first detection apparatus and configured to detect a third thermal-runaway parameter inside the battery module, the fourth detection apparatus is a backup detection apparatus of the second detection apparatus and configured to detect a fourth thermal-runaway parameter outside the battery module, and after sending the detection-apparatus fault signal to the temperature control apparatus, the computer programs further comprise instructions configured to perform:

receiving a detection request sent, within a first preset time, by the temperature control apparatus;

obtaining the third thermal-runaway parameter inside the battery module and the fourth thermal-runaway parameter outside the battery module in response to the detection request;

determining that the first detection apparatus fails, when an error between the first thermal-runaway parameter and the third thermal-runaway parameter is greater than a first preset difference, and an error between the second thermal-runaway parameter and the fourth thermal-runaway parameter is less than or equal to a second preset difference; and determining that the second detection apparatus fails, when the error between the first thermal-runaway parameter and the third thermal-runaway parameter is less than or equal to the first preset difference, and the error between the second thermal-runaway parameter and the fourth thermal-runaway parameter is greater than the second preset difference.

13. The computer device of claim 12, wherein the computer programs further comprise instructions configured to perform:

obtaining a first fault-type evaluation parameter within a second preset time based on a determination that the first detection apparatus fails, and determining a fault type of the first detection apparatus according to the first fault-type evaluation parameter; and obtaining a second fault-type evaluation parameter within the second preset time based on a determination that the second detection apparatus fails, and determining a fault type of the second detection apparatus according to the second fault-type evaluation parameter, wherein the fault type comprises a failure and a deviation, the failure indicates that a detected value of a detector is always a fixed value, and the deviation indicates that the detected value is different from an actual value.

14. The computer device of claim 12, wherein the computer programs further comprise instructions configured to perform:

determining that the battery module fails, when the second thermal-runaway parameter and the fourth thermal-runaway parameter each are greater than the second threshold, based on a determination that the first detection apparatus fails; and determining that the battery module fails, when the first thermal-runaway parameter and the third thermal-runaway parameter each are greater than the first threshold, based on a determination that the second detection apparatus fails.

15. The computer device of claim 14, wherein the computer programs further comprise instructions configured to perform:

obtaining a difference-threshold evaluation parameter, wherein the difference-threshold evaluation parameter comprises a battery cell type, a thermal-runaway parameter type, historical data of the first thermal-runaway parameter stored on the computer device, and historical data of the second thermal-runaway parameter stored on the computer device; and determining the difference threshold according to the difference-threshold evaluation parameter.

16. The computer device of claim 15, wherein the computer programs further comprise instructions configured to perform:

determining that both the first detection apparatus and the second detection apparatus of a first battery module in a plurality of battery modules fail, when an error between the first thermal-runaway parameter and the third thermal-runaway parameter of the first battery module is greater than the first preset difference, and an error between the second thermal-runaway parameter and the fourth thermal-runaway parameter of the first battery module is greater than the second preset difference;

determining that both the first detection apparatus and the second detection apparatus of a second battery module adjacent to the first battery module in the plurality of battery modules do not fail, when an error between the first thermal-runaway parameter and the third thermal-runaway parameter of the second battery module is less than or equal to the first preset difference, and an error between the second thermal-runaway parameter and the fourth thermal-runaway parameter of the second battery module is less than or equal to the second preset difference; and determining that the first battery module fails, when the first thermal-runaway parameter detected by the first detection apparatus of the second battery module is less than or equal to the first threshold, and the second thermal-runaway parameter detected by the second detection apparatus of the second battery module is greater than a third threshold, when both the first detection apparatus and the second detection apparatus of the first battery module fail, and both the first detection apparatus and the second detection apparatus of the second battery module do not fail.

17. The computer device of claim 16, wherein the third threshold is less than the second threshold.

18. The computer device of claim 12, wherein the first detection apparatus comprises a first temperature-detector configured to detect an internal temperature of the battery module, a first combustible-gas-detector configured to detect an internal combustible-gas concentration of the battery module, and a first smoke-detector configured to detect an internal smoke concentration of the battery module;

the second detection apparatus comprises a second temperature-detector configured to detect an external temperature of the battery module, a second combustible-gas-detector configured to detect an external combustible-gas concentration of the battery module, and a second smoke-detector configured to detect an external smoke concentration of the battery module;

the first thermal-runaway parameter comprises a first temperature detected by the first temperature-detector, a first combustible-gas-concentration detected by the first combustible-gas-detector, and a first smoke-concentration detected by the first smoke-detector; and the second thermal-runaway parameter comprises a second temperature detected by the second temperature-detector, a second combustible-gas-concentration detected by the second combustible-gas-detector, and a second smoke-concentration detected by the second smoke-detector.

\* \* \* \* \*